(12) United States Patent
Wang

(10) Patent No.: US 7,349,548 B2
(45) Date of Patent: Mar. 25, 2008

(54) ELECTRONIC APPARATUS AND CONTROL METHOD THEREOF

(75) Inventor: Houk Wang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 877 days.

(21) Appl. No.: 10/689,715

(22) Filed: Oct. 22, 2003

(65) Prior Publication Data

US 2004/0096071 A1    May 20, 2004

(30) Foreign Application Priority Data

Nov. 14, 2002  (KR) ............... 10-2002-0070629
Jan. 14, 2003  (KR) ............... 10-2003-0002485

(51) Int. Cl.
*H03G 3/00* (2006.01)

(52) U.S. Cl. ............... 381/104; 381/119; 381/109; 381/107; 455/556.1; 455/567

(58) Field of Classification Search ............... 381/104, 381/107, 109, 119; 700/94; 455/556.1, 455/567
See application file for complete search history.

(56) References Cited

U.S. PATENT DOCUMENTS 5,046,107 A  *  9/1991  Iwamatsu ............... 381/107
5,054,077 A  *  10/1991 Suzuki ............... 381/109
6,205,217 B1 *  3/2001  Nobusawa ............... 379/395
6,445,802 B1 *  9/2002  Dan ............... 381/104
6,662,022 B1 *  12/2003 Kanamori et al. ....... 455/556.1
6,801,630 B1 *  10/2004 Shibata ............... 381/119
2002/0118848 A1* 8/2002 Karpenstein ............... 381/119
2002/0120833 A1   8/2002 Chen et al.

FOREIGN PATENT DOCUMENTS

| JP | 11-296167 | 10/1999 |
|---|---|---|
| JP | 2001-84112 | 3/2001 |
| KR | 96-24885 | 7/1996 |
| KR | 1997-0029007 | 6/1997 |
| KR | 2001-0111729 | 12/2001 |

* cited by examiner

*Primary Examiner*—Vivian Chin
*Assistant Examiner*—Disler Paul
(74) *Attorney, Agent, or Firm*—Staas & Halsey LLP

(57) ABSTRACT

An electronic apparatus and method thereof include a plurality of sound input channels through which audio signals are input, a plurality of individual volume controllers to individually control output volume levels of the audio signals input through the sound input channels, and a mixer to mix the audio signals provided by the individual volume controllers and to output mixed audio signals. The electronic apparatus includes a selection part through which one of the sound input channels is selected, and a controller controlling the individual volume controllers to make the selected sound input channel have a normal volume level and to lower the output volume levels of unselected input channels below a predetermined volume level.

11 Claims, 3 Drawing Sheets

ELECTRONIC APPARATUS AND CONTROL METHOD THEREOF

CROSS-REFERENCE TO RELATED APPLICATIONS

This application claims the benefit of Korean Patent Application No. 2002-70629, filed Nov. 14, 2002 and Korean Patent Application No. 2003-0002485, filed Jan. 14, 2003, in the Korean Intellectual Property Office, the disclosures of which are incorporated herein by reference.

BACKGROUND OF THE INVENTION

1. Field of the Invention

The present invention relates to an electronic apparatus and a control method thereof, and more particularly, to an electronic apparatus and a control method thereof, which can automatically control output volume.

2. Description of the Related Art

There are various conventional electronic apparatuses having a sound input/output function, for example, an audio system, a TV, a computer system, etc. In the case of the computer system, a CD-ROM drive connected to a sound card allows a user to listen to music recorded on a CD, like the audio system. Also, various sound devices can be connected to the computer system through sound input channels provided in a computer main body.

The sound card used in the computer system converts an analog sound to digital data that can be stored in an audio file, or converts digitized audio signals to analog signals that can be played on the computer's speakers. The analog signal is inputted through the sound input channel such as a microphone-in channel, a line-in channel, an auxiliary-in channel, a CD audio connector, etc., and mixed by an analog mixing circuit, and amplified by an amplifying circuit, and output to the speaker. Also, the analog signal is converted to the digital signal by an A/D converter. Further, the digitized audio signal is inputted through a system bus, mixed by a digital mixing circuit, converted to the analog signal by a D/A converter, amplified by the amplifying circuit, and output to the speaker.

Here, the mixing circuit is employed to adjust the analog/digital audio signals like a control amplifier of the audio system. The mixing circuit includes a plurality of individual volume controllers to individually control output volume levels of the audio signals input through the respective sound input channels, a mixer to mix the audio signals provided by the individual volume controllers, and a master volume controller to control the output volume of the audio signal transmitted from the mixer. With the above-described configuration, the audio signals of respective sound input channels and the mixed audio signal can be controlled in the output volume, for example, muting, turning up, and turning down.

However, the above-described computer system includes the sound input channels such as the microphone-in channel, the line-in channel, the auxiliary-in channel, etc., so that the audio signals of the respective sound input channels are simultaneously output to the speaker. Accordingly, when the user wants to listen to the sound from one of the sound input channels, output volume levels of the other sound input channels must be controlled. In the computer system, the above selective volume control is achieved by the above-described mixing circuit. The mixing circuit is operated according to a setup of a volume control program, for example, the volume controller of a speaker-icon type, wherein the volume control program is executed under an operating system such as Windows, and allows the user to set up the output volume levels of the respective sound input channels.

Hence, in the conventional electronic apparatus having the plurality of sound input channels, when the user wants to listen to the sound from a selected sound input channel, the user has to individually set up the output volume levels of the other unselected sound input channels to be muted or lowered, which is inconvenient to the user.

SUMMARY OF THE INVENTION

In accordance with an aspect of the present invention, there is provided an electronic apparatus and a control method thereof, in which output volume levels of unselected sound input channels are automatically lowered below a predetermined volume level except an output volume level of a selected sound input channel.

These together with other aspects and/or advantages which will be subsequently apparent, reside in the details of construction and operation as more fully hereinafter described and claimed, reference being had to the accompanying drawings forming a part thereof, wherein like numerals refer to like parts throughout.

The foregoing and/or other aspects of the present invention are achieved by providing an electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, including: a selection part through which one of the sound input channels is selected; and a controller controlling the individual volume controllers to make the selected sound input channel have a normal volume level and to lower the output volume levels of unselected input channels below a predetermined volume level.

According to an aspect of the invention, the electronic apparatus further includes a memory storing setup volume levels previously set up for the unselected sound input channels.

According to an aspect of the invention, the controller controls the memory to store initial volume levels of the unselected sound input channels to which the output volume levels are lowered according to the selected sound input channel.

According to an aspect of the invention, the controller controls the individual volume controllers to restore the output volume level of a new selected sound input channel to the initial volume level stored in the memory, wherein the new selected sound input channel is one of the unselected sound input channels selected by the selection part.

According to an aspect of the invention, the controller controls the individual volume controllers to restore the output volume levels of the unselected sound input channels to the initial volume levels stored in the memory, when the selected sound input channel is released from the selection.

According to another aspect of the invention, the above and/or other aspects may be also achieved by providing a method of controlling an electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, including: enabling a selection of one of the sound input channels; and controlling the individual volume controllers to make the selected sound input channel have a normal volume level and to lower output volume levels of unselected input channels below a predetermined volume level.

According to an aspect of the invention, the method further includes storing setup volume levels previously set up for the unselected sound input channels.

According to an aspect of the invention, the method further includes storing initial volume levels of the unselected sound input channels to which the output volume levels are lowered according to the selected sound input channel.

According to an aspect of the invention, the method further includes controlling the individual volume controllers to restore the output volume level of a new selected sound input channel to the initial volume level stored in the memory, wherein the new selected sound input channel is one of the unselected sound input channels.

According to an aspect of the invention, the method further includes controlling the individual volume controllers to restore the output volume levels of the unselected sound input channels to the initial volume levels stored in the memory when the selected sound input channel is released from the selection.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
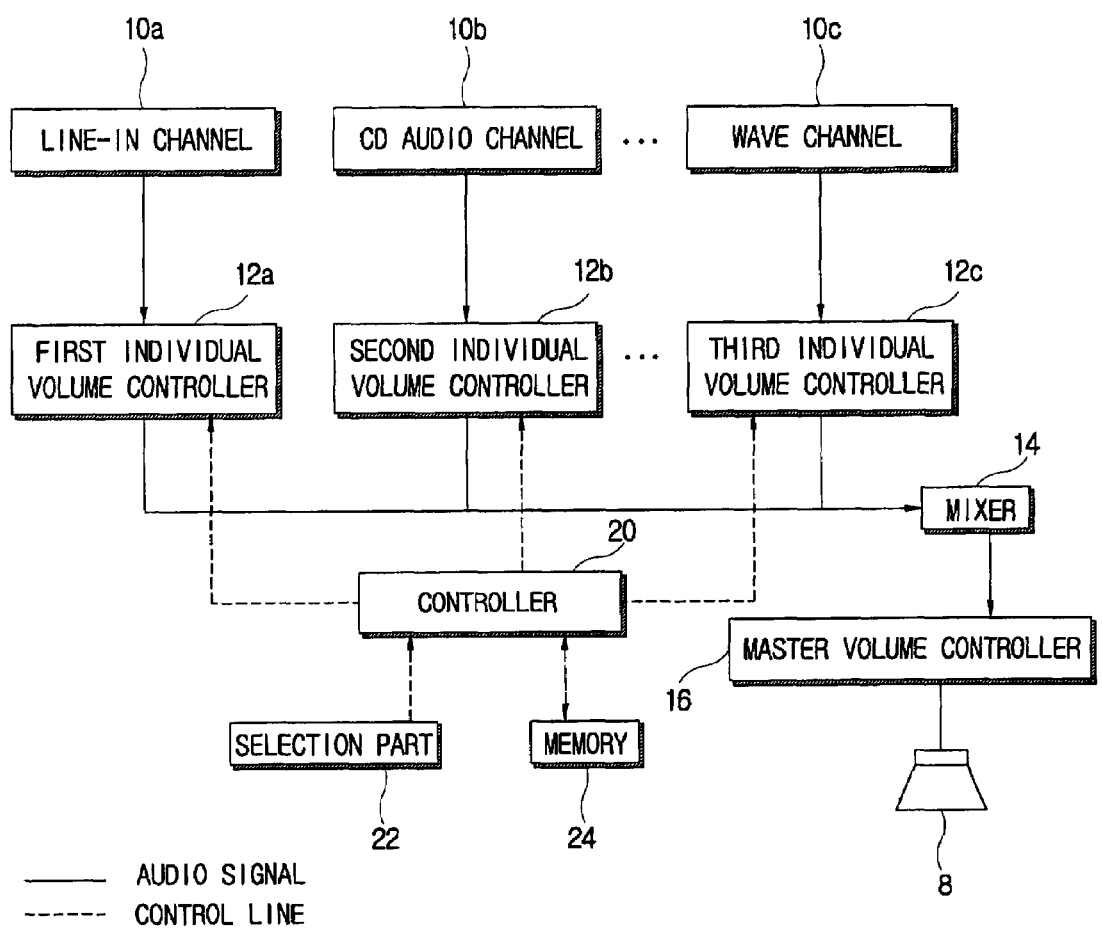
FIG. 1 is a control block diagram of an electronic apparatus, according an aspect of to the present invention.

Reference will now be made in detail to the aspects of the present invention, examples of which are illustrated in the accompanying drawings, wherein like reference numerals refer to like elements throughout. The aspects are described below in order to explain the present invention by referring to the figures.

FIG. 1 is a control block diagram of an electronic apparatus, according to an aspect of the present invention. As shown therein, an electronic device, according to one aspect of the present invention includes, a plurality of sound input channels 10a, 10b, and 10c, a plurality of individual volume controllers 12a, 12b, and 12c to individually control output volume levels of audio signals inputted through the respective sound input channels 10a, 10b, and 10c, a mixer 14 to mix the audio signals provided by the individual volume controllers 12a, 12b, and 12c and to output the mixed audio signals to a master volume controller 16, and a speaker 18 to output the audio signals to a user. The electronic device further includes a selection part 22 through which a desired sound input channel 10a, 10b, or 10c can be selected, a microprocessor used as a controller 20 to control the individual volume controllers 12a, 12b, and 12c according to selection in the selection part 22, and a memory 24 to store a user setup volume level and present volume levels of the sound input channels 10a, 10b, and 10c.

For example, a sound card used in a computer system receives the audio signals through the plurality of sound input channels 10a, 10b, and 10c, such as a line-in channel 10a, a CD audio channel 10b, a wave channel 10c, etc., and outputs the audio signals to the speaker 18. Further, a mixing circuit mounted on the sound card includes the plurality of individual volume controllers 12a, 12b, and 12c to individually control the output volume levels of the audio signals input through the respective sound input channels 10a, 10b and 10c, a mixer 14 to mix the plurality of audio signals whose output volume is already controlled by the individual volume controllers 12a, 12b, and 12c and outputting a mixed audio signal indicative thereof, and the master volume controller 16 to control the output volume of the mixed audio signal transmitted from the mixer 14. With the above-described configuration of the electronic device, the audio signals of the respective sound input channels 10a, 10b, and 10c and the mixed audio signal can be controlled in the output volume.

The selection part 22 allows the user to select the sound input channels 10a, 10b, or 10c that will have a normal volume level. In the case of the computer system, the selection part 22 may be provided as a specific key on a keyboard. When the specific key is pushed, a scan code corresponding to the specific key is converted to a system readable scan code by a keyboard controller and transmitted to the microprocessor used as the controller 20. The microprocessor processes the system readable scan code and determines which one of the sound input channels 10a, 10b, or 10c is selected.

The memory 24 is employed for storing present output volume levels of unselected sound input channels 10a, 10b, and 10c therein when one of the sound input channels 10a, 10b, or 10c is selected through the selection part 22. Therefore, when the selected sound input channel 10 is released from the selection, the output volume levels of the unselected sound input channels 10a, 10b, and 10c, which have been lowered below a predetermined volume level, can be restored to initial volume levels corresponding to the present volume levels stored in the memory 24. Further, the memory 24 stores therein the setup volume level, which is previously set up by the user and employed as the output volume level of the unselected sound input channels 10a, 10b, and 10c. Therefore, when the sound input channel 10a, 10b, or 10c is selected through the selection part 22, the output volume levels of the unselected sound input channels 10a, 10b, and 10c are lowered to the setup volume level previously stored in the memory 24. Here, the setup volume level may be relatively much lower than the output volume of the selected sound input channel 10a, 10b, or 10c, thereby preventing the output sound of the unselected sound input channels 10a, 10b, and 10c from interfering with the output sound of the selected sound input channel 10a, 10b, or 10c.

When the user selects one sound input channel input a desiring audio signal among the sound input channels 10a, 10b, and 10c through the selection part 22, the microprocessor controls the individual volume controller 12 to make the selected input channel 10a, 10b, or 10c has the normal volume level and to lower the output volume levels of the unselected input channels 10a, 10b, and 10c below the predetermined volume level. Here, the lowered output volume levels of the unselected input channels 10a, 10b, and 10c are the setup volume levels stored in the memory 24. Further, when the selected sound input channel 10a, 10b, or 10c is released from the selection through the selection part 22, the controller 20 controls the individual volume controller 12 to restore the output volume levels of the unselected sound input channels 10a, 10b, and 10c, which has been lowered to the predetermined volume level, to the initial volume levels stored in the memory 24.

Figure 2:
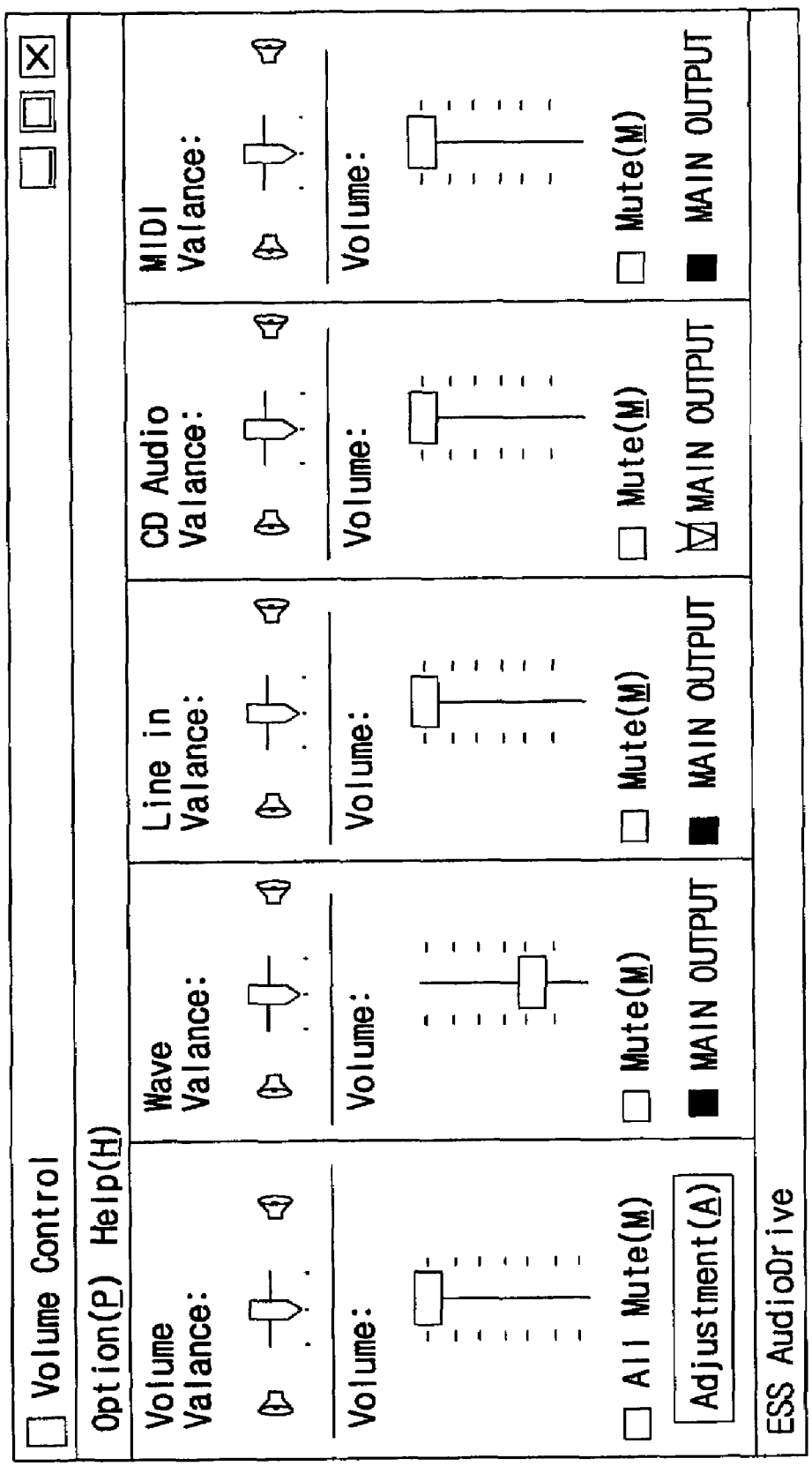
FIG. 2 illustrates an application as an example of a selection part and a controller.

FIG. 2 illustrates the controller 20 and the selection part 22 according to another aspect of the present invention, which are implemented as an application based on an operating system by way of example. As shown therein, an application (hereinafter referred to as "sound input channel selection program") includes a control routine and a selection routine to display a selection menu. In this aspect, configurations except the sound input channel selection program are the same as those of FIG. 1, so that the repetitive descriptions will be avoided as necessary.

When the sound input channel selection program is executed, as shown in FIG. 2, the selection menu, such as a check box is displayed to select a main output channel, and a control bar, etc., for each sound input channel 10a, 10b, or 10c.

When the user selects the sound input channel 10a, 10b, or 10c as the main output channel by checking one of the check boxes, the unchecked check boxes of the unselected sound input channels 10a, 10b, and 10c are inactivated, so that the output volume levels of the unselected sound input channels 10a, 10b, and 10c except the output volume level of the selected sound input channel 10a, 10b, or 10c cannot be manually controlled and are lowered to the setup volume level previously stored in the memory 24.

In the above-described aspects of the present invention, the selection part 22 is achieved by the specific key on the keyboard and by the selection menu of the sound input channel selection program. However, the selection part 22 may be a play or operation button (icon) of a predetermined application program for a sound output function.

For example, in the case that the computer system is equipped with a speakerphone, and an application program for driving the speakerphone is installed in the operating system such as Windows, an icon for a telephone call of the application program is employed as the selection part 22. That is, when the user clicks the icon for the telephone call, the output volume level of each sound input channel 10a, 10b, and 10c is lowered below the predetermined volume level except the output volume level of the microphone-in channel. Thus, when the user talks over the telephone, the output volume levels of the sound input channels 10a, 10b, and 10c unrelated to talking over the telephone are automatically controlled, thereby allowing the user to talk over the telephone without interfering with the output sound of the unrelated sound input channels 10a, 10b, and 10c.

Figure 3:
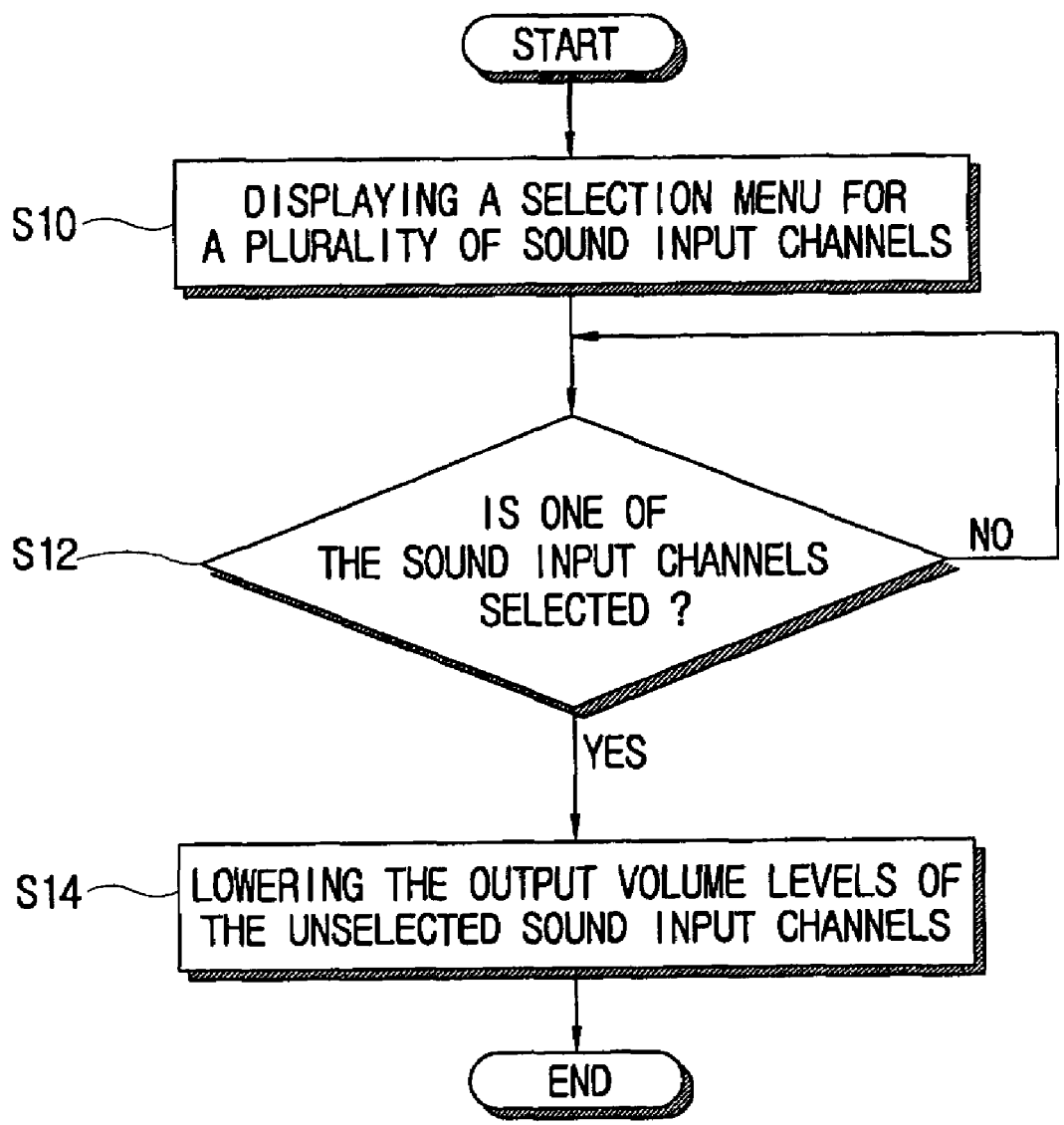
FIG. 3 is a control flowchart of the electronic apparatus, according to an aspect of the present invention.

FIG. 3 is a control flowchart of the electronic apparatus, according to an aspect of the present invention, in a state where the sound input channel selection program is executing. Here, the output volume levels of the unselected sound input channels 10a, 10b, and 10c can be previously set up through the sound input channel selection program. As shown therein, at operation S10, the sound input channel selection program displays the selection menu corresponding to the sound input channels 10a, 10b, and 10c so as to select one of the sound input channels 10a, 10b, and 10c for the main output channel. At operation S12, the user selects one of the sound input channels 10a, 10b, or 10c through the selection menu. Then, at operation S14, the present volume levels of the other unselected sound input channels 10a, 10b, and 10c are stored in the memory 24 and lowered to the setup volume level previously stored in the memory 24, thereby allowing only the selected sound input channel 10a, 10b, or 10c to have the normal volume level. Further, when the selected sound input channel 10a, 10b, or 10c is released from the selection, the output volume levels of the unselected sound input channels 10a, 10b, and 10c, which have been lowered to the setup volume level, are restored to the initial volume levels stored in the memory 24. As described above, the electronic apparatus, according to an aspect of the present invention, can automatically lower the unrelated sound, thereby normally outputting only the sound selected by the user. Automatically lowering the unrelated sound is an operation performed in a manner essentially independent of external influence or control, for instance, independent from an intervention from the user.

On the other hand, in the case of the microprocessor used as the controller 20, the above-described selection can be achieved by the selection part 22 of a hardware type instead of the selection menu.

For example, the above-described control flow in the computer system with the speakerphone is as follows. When the user talks over the telephone, the unrelated output sound interferes with the user's talking. Hence, the user selects the microphone-in channel through the selection part 22. Here, the selection part 22 may be the icon for the telephone call provided in the application program for driving the speakerphone. When the user clicks on the icon for the telephone call, the present volume levels of the unrelated sound input channels 10a, 10b, and 10c are stored in the memory 24 except the output volume level of the microphone-in channel so as to be used as the initial volume level and are simultaneously lowered to the setup volume levels previously set up by the user, thereby preventing the output sound of the unselected sound input channels 10a, 10b, and 10c from interfering with the output sound of the selected sound input channel 10a, 10b, or 10c. Thereafter, the volume levels of the unselected sound input channels 10a, 10b, and 10c are restored to the initial volume level stored in the memory 24. Accordingly, the user can listen to sound from the selected sound input channel 10a, 10b, or 10c without individually controlling the output volume levels of the other unselected sound input channels 10a, 10b, and 10c.

Here, in the case that the output volume levels of the unselected sound input channels 10a, 10b, and 10c are restored to the initial volume level according as the user disconnects the telephone call, the disconnection of the telephone call means that no audio signal is input to the selected sound input channel 10a, 10b, or 10c. In the case where no audio signal is inputted to the selected sound input channel 10a, 10b, or 10c for a predetermined period of time, the controller 20 determines whether no audio signal is inputted to the selected sound input channel 10, and operates like when the selected sound input channel 10 is released from the selection.

In the above-described aspect of the present invention, the output volume levels of the unselected sound input channels 10a, 10b, and 10c is lowered below a predetermined volume level, but may be controlled to be muted.

In the above-described embodiment, one sound input channel 10a, 10b, or 10c selected through the selection part 22 is the microphone-in channel by way of example. However, any one desired sound input channel among various sound input channels 10a, 10b, and 10c can be selected through the selection part 22. For example, when the user selects the CD audio channel 10b through the selection part 22 in the state that the line-in channel 10a has the normal volume level, the output volume level of the CD audio channel 10b is converted to the normal volume level, and the output volume level of the line-in channel 10a is lowered below the predetermined volume level. That is, the output volume levels of the unselected sound input channels 10a, 10b, and 10c are automatically lowered below the predetermined volume level except for the output volume level of the CD audio channel 10b.

As described above, according to an aspect of the present invention, there are provided the selection part 22 through which the desired sound input channel 10a, 10b, or 10c among the plurality of sound input channels 10a, 10b, and 10c is selected, and the controller 20 controlling the individual volume controllers 12a, 12b, and 12c to make the selected input channel 10a, 10b, or 10c have the normal volume level and to lower the output volume levels of the unselected input channels 10a, 10b, and 10c below the predetermined volume level. Thus, the output volume levels of the other sound input channels 10a, 10b, and 10c can be automatically controlled when the selected sound input channel 10a, 10b, or 10c is used.

As described above, the present invention provides an electronic apparatus and a control method thereof, in which output volume levels of unselected sound input channels are automatically controlled when a specific sound input channel is selected.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, comprising:
   a selection part through which one of the sound input channels is selected;
   a controller controlling the individual volume controllers to make the selected sound input channel have a normal volume level and to lower the output volume levels of unselected input channels below a predetermined volume level; and
   a memory storing setup volume levels previously set up for the unselected sound input channels,
   wherein the controller controls the memory to store initial volume levels of the unselected sound input channels to which the output volume levels are lowered according to the selected sound input channel,
   wherein the controller controls the individual volume controllers to restore the output volume levels of the unselected sound input channels to the initial volume levels stored in the memory, when the selected sound input channel is released from the selection, and
   wherein the selection part allows a user to select the selected sound input channel.

2. The electronic apparatus according to claim 1, further comprising:
   a master volume controller to control an output volume level of the mixed audio signals transmitted from the mixer; and
   a speaker to output the audio signals of the selected sound input channel to a user.

3. The electronic apparatus according to claim 1, wherein the selection part is a specific key on a keyboard, wherein when the specific key is pushed, a scan code corresponding to the specific key is converted to a system readable scan code and is transmitted to the controller, where the controller processes the system readable scan code and determines the sound input channel is selected.

4. The electronic apparatus according to claim 1, wherein the setup volume levels are lower than the output volume level of the selected sound input channel to prevent output sounds of the unselected sound input channels from interfering with an output sound of the selected sound input channels.

5. The electronic apparatus according to claim 1, wherein the selection part comprises an icon for a telephone call, where when the user clicks on the icon for the telephone call, the output volume levels of the unselected sound input channels are lowered below the predetermined volume level.

6. An electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, comprising:
   a selection part through which one of the sound input channels is selected;
   a controller controlling the individual volume controllers to make the selected sound input channel have a normal volume level and to lower the output volume levels of unselected input channels below a predetermined volume level; and
   a memory storing setup volume levels previously set up for the unselected sound input channels,
   wherein the controller controls the memory to store initial volume levels of the unselected sound input channels to which the output volume levels are lowered according to the selected sound input channel,
   wherein the controller controls the individual volume controllers to restore the output volume level of a new selected sound input channel to the initial volume level stored in the memory, wherein the new selected sound input channel is one of the unselected sound input channels selected by the selection part, and
   wherein the selection part allows a user to select the selected sound input channel and the new selected sound input channel.

7. The electronic apparatus of claim 6, further comprising:
   a master volume controller to control an output volume level of the mixed audio signals transmitted from the mixer; and
   a speaker to output the audio signals of the selected sound input channel to a user.

8. The electronic apparatus of claim 6, wherein the setup volume levels are lower than the output volume level of the selected sound input channel to prevent output sounds of the unselected sound input channels from interfering with an output sound of the selected sound input channels.

9. A method of controlling an electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, the method comprising:
   enabling a selection of one of the sound input channels by a user;
   controlling the individual volume controllers to make the selected sound input channel have a normal volume level and to lower output volume levels of unselected input channels below a predetermined volume level;

storing setup volume levels previously set up for the unselected sound input channels;

storing initial volume levels of the unselected sound input channels to which the output volume levels are lowered according to the selected sound input channel; and controlling the individual volume controllers to restore the output volume levels of the unselected sound input channels to the initial volume levels stored in the memory when the selected sound input channel is released from the selection by the user.

10. The method according to claim 9, further comprising:

displaying a selection menu comprising check boxes to select the one of the sound input channels as a main output channel, and a control bar for each sound input channel, wherein the check boxes of the unselected sound input channels are inactivated and only the output volume is controlled; and lowering the unselected sound input channels to the setup volume level stored in the memory.

11. A method of controlling an electronic apparatus having a plurality of sound input channels through which audio signals are input, a plurality of individual volume controllers to individually control output volume levels of the audio signals input through the sound input channels, and a mixer to mix the audio signals provided by the individual volume controllers and to output mixed audio signals, the method comprising:

enabling a selection of one of the sound input channels by a user;

controlling the individual volume controllers to make the selected sound input channel have a normal volume level and to lower output volume levels of unselected input channels below a predetermined volume level;

storing setup volume levels previously set up for the unselected sound input channels;

storing initial volume levels of the unselected sound input channels to which the output volume levels are lowered according to the selected sound input channel; and controlling the individual volume controllers to restore the output volume level of a new selected sound input channel to the initial volume level stored in the memory, wherein the new selected sound input channel is one of the unselected sound input channels and the new selected sound input channel is selected by a user.

* * * * *